US012410898B1

(12) United States Patent
Pan

(10) Patent No.: US 12,410,898 B1
(45) Date of Patent: Sep. 9, 2025

(54) LIGHT AND SHADOW WATER LAMP STRUCTURE

(71) Applicant: HUIZHOU DICHENG ELECTRONIC TECHNOLOGY CO., LTD, Huizhou (CN)

(72) Inventor: Binjie Pan, Huizhou (CN)

(73) Assignee: HUIZHOU DICHENG ELECTRONIC TECHNOLOGY CO., LTD., Huizhou (CN)

(*) Notice: Subject to any disclaimer, the term of this patent is extended or adjusted under 35 U.S.C. 154(b) by 0 days.

(21) Appl. No.: 18/669,547

(22) Filed: May 21, 2024

(51) Int. Cl.
*F21S 10/00* (2006.01)

(52) U.S. Cl.
CPC .................................. *F21S 10/002* (2013.01)

(58) Field of Classification Search
CPC .................................................... F21S 10/002
See application file for complete search history.

(56) References Cited

U.S. PATENT DOCUMENTS 9,222,663 B1 * 12/2015 Yang ...................... F21S 6/002
10,825,366 B1 * 11/2020 Yang ...................... G09F 19/12
11,378,240 B1 * 7/2022 Yang ...................... G03B 21/20
2016/0010819 A1 * 1/2016 Yang ...................... F21S 6/002
362/101
2024/0384846 A1 * 11/2024 Pan ........................ F21S 6/002
2025/0035277 A1 * 1/2025 Pan .......................... F21V 3/02

FOREIGN PATENT DOCUMENTS

CN 2524369 Y * 12/2022
GB 2094622 A * 9/1982 ............ A47G 33/06

* cited by examiner

*Primary Examiner* — Keith G. Delahoussaye
(74) *Attorney, Agent, or Firm* — Leong C. Lei

(57) ABSTRACT

Disclosed is a structure, including: a water lamp body, a shell and an electronic control unit, the water lamp body for the internal hollow three-dimensional shape, the shell is three-dimensional shape placed on the outside of the body of the water lamp, and the shell is opened with a wisp hollow part, and in the wisp hollow part of the light transmissive sheet, the electronic control unit contains a power supply part, light-emitting members, circuit boards and switches, light-emitting members are provided with two groups and were connected with the power supply part The light-emitting members are provided in two groups and are connected electrically with the power supply part, the light source of one group of light-emitting members is used to irradiate the light-transmitting sheet, and the light source of the other group of light-emitting members is used to irradiate the main body of the water lamp.

10 Claims, 4 Drawing Sheets

LIGHT AND SHADOW WATER LAMP STRUCTURE

TECHNICAL FIELD

The invention relates to the technical field of craft ornaments, and particularly relates to a light and shadow water lamp structure.

BACKGROUND ART

According to today's people focus on the quality of life, in the living space design and layout are required to atmosphere of relaxation and the sense of self space design, and in the living space set up decorations or lighting, in order to create an excellent atmosphere.

Currently, there are many types and styles of lighting, the more common of which are monochrome lighting, color-changing lighting or flashing lights, etc.; however, this type of lighting usually only has a single lighting function, although it can be placed in different spaces, but its shape and light effect is still not able to meet the user's needs. Therefore, if the above lighting can be combined with other parts of the interesting effects or break through the visual appearance of the advantages, I believe that it will be more popular among the public.

INVENTION CONTENTS

The purpose of the invention is to provide a light and shadow water lamp structure that can be both modeling and controlling and improve the visual sensation.

In order to solve the above technical problems, the invention can be realized by adopting the following technical solutions:

A light and shadow water lamp structure, comprising:

A water lamp body, which is a hollow three-dimensional modeling;

A shell, three-dimensional shape placed on the outside of the body of the water lamp, and the shell is opened with a wisp hollow part, and in the wisp hollow part of the light transmissive sheet, the light transmissive sheet for the painted plastic sheet or three-dimensional shape of the PVC sheet;

An electronic control unit, including a power supply part, a light-emitting members, a circuit board and a switch, light-emitting members are provided with two groups, and were electrically connected to the power supply part, and the two groups of light-emitting members were set up on the upper and lower sides of the circuit board, where a group of light-emitting members of the light source for irradiation of the translucent sheet, the other group of light-emitting members of the light source for irradiation of the main body of the water lamp.

In one embodiment, the light transmissive sheet is a slide, wherein a light source of the set of light-emitting members can project a pattern to the outside when irradiated on the light transmissive sheet.

In one embodiment, the body of the water lamp comprising a housing and a water lamp cover, the water lamp cover being hermetically closed to the bottom of the housing to form a hermetic space, and the hermetic space being filled with a flowable liquid.

In one embodiment, the bottom surface of the housing is set at an angle to the water light cover.

In one embodiment, a motor with a magnetic shaft is provided at the bottom of the body of the water lamp, the motor is electrically connected to a power supply part, and a magnetic rotary member corresponding to the magnetic shaft is provided inside the body of the water lamp, and the magnetic rotary member is magnetically attracted to the magnetic shaft and rotates accordingly.

In one embodiment, the water lamp body is provided with an ornament inside the water lamp body.

In one embodiment, the circuit board is available for controlling two sets of light-emitting members to start and stop simultaneously or to start and stop in parts.

In one embodiment, the switch can be used to turn on and off the power of the power supply part, and the switch is an inductive switch.

In one embodiment, the switch is any one of a light-sensitive switch, an acoustic switch, a human-sensitive switch, and a microwave switch.

The beneficial effect is:

The new light and shadow water lamp structure, in the shell to open the wisp hollow part, and in the wisp hollow part is provided with a translucent sheet, and at the same time the shell is provided with two groups of light-emitting members, by which one group of light-emitting members of the light source of the translucent sheet irradiation, so as to emit light, and by the other group of light-emitting members of the body of the water lamp to irradiate the body of the water lamp, so that the body of the water lamp is also emitted light, and then combined with the switch of the sensing way, the two groups of light-emitting members of the control way and the body of the water lamp and the combined with the switch sensing method, the control method of the two groups of light-emitting members and the three-dimensional modeling of the water lantern body and shell, the light and shadow water lantern structure has more external modeling and interesting effects, thus satisfying the visual perception of consumers and ensuring that the light and shadow water lantern structure is favored by consumers.

DETAILED DESCRIPTION OF THE EMBODIMENTS

In order to make the above purposes, features and advantages of the invention more obvious and understandable, the following description of the specific embodiment of the invention is made in detail in conjunction with the accompanying drawings. Many specific details are set forth in the following description in order to facilitate a full understanding of the invention. However, the present invention can be implemented in many other ways different from those described herein, and the person skilled in the art can make similar improvements without violating the connotation of the present invention, so the present invention is not limited by the specific embodiments disclosed below.

It should be noted that when a component is said to be “fixed” to another component, it may be directly on the other component or there may also be centered components. When a component is said to be “attached” to another component, it may be directly attached to the other component or there may be both centered components. Conversely, when a component is said to be “directly on” another component, there is no intermediate component. The terms “vertical,” “horizontal,” “left,” “right,” and similar expressions used herein are for illustrative purposes only.

Unless otherwise defined, all technical and scientific terms used herein have the same meaning as commonly understood by those skilled in the art of the present invention. Terms used herein in the specification of the present invention are for the purpose of describing specific embodiments only and are not intended to limit the present invention. The term “and/or” as used herein includes any and all combinations of one or more of the relevant listed items.

Figure 1:
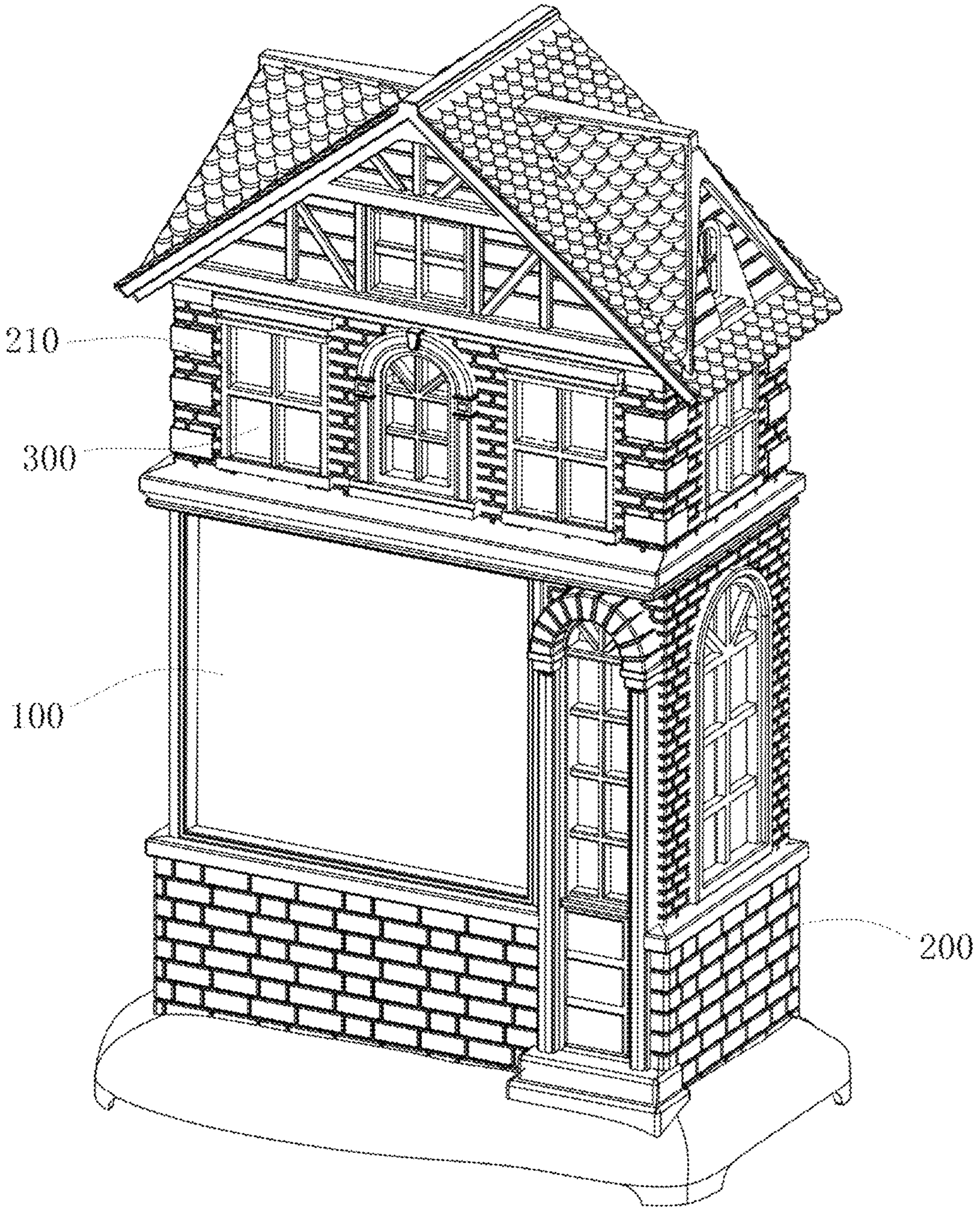
FIG. 1 shows a schematic diagram of the structure of the new light and shadow water lamp structure.
Figure 2:
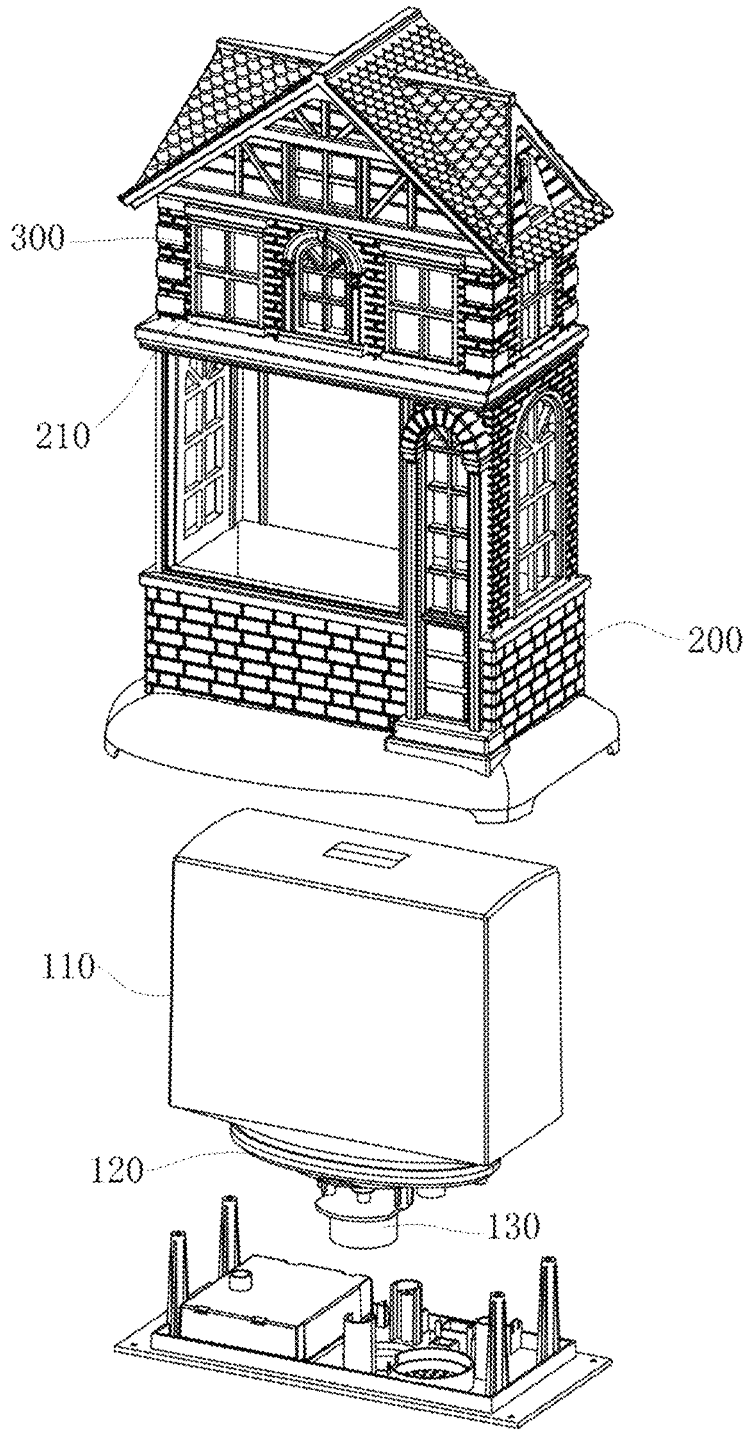
FIG. 2 shows a decomposition schematic diagram of the new light shadow water lamp structure.
Figure 3:
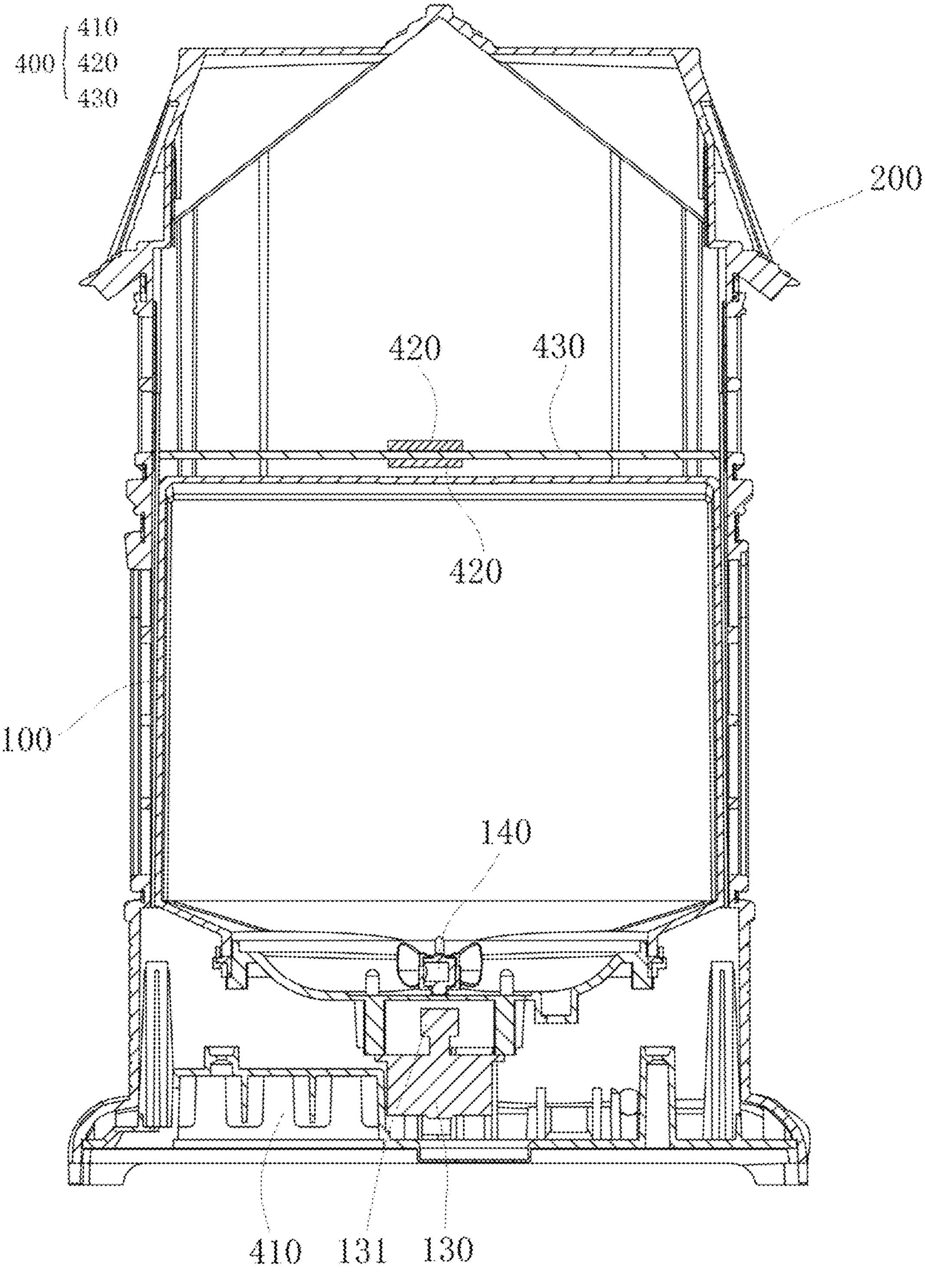
FIG. 3 is a sectional view of the new light shadow water lamp structure.

Referring to FIGS. 1 through 3, a lighted water lamp structure comprising:

A water lamp body 100 of the light fixture, which is a three-dimensional shape with a hollow interior;

A housing 200, which is three-dimensionally shaped and placed on the outside of the water lamp body 100, and the housing 200 is provided with a wisp hollow part 210, and a light-transmitting sheet 300 is provided in the wisp hollow part 210;

An electronic control unit 400, comprising a power supply part 410, a light-emitting member 420, a circuit board 430, and a switch (not shown in the figure), the light-emitting member 420 is provided with two groups and is electrically connected to the power supply part 410, wherein the light source of one group of light-emitting members 420 is used to irradiate the light-transmitting sheet 300, and the light source of the other group of light-emitting members 420 is used to irradiate the main body of the water lamp body 100;

The circuit board 430 can be used to control two groups of light-emitting members 420 to start and stop simultaneously or to start and stop in sections, the switch can be used to turn on and off the power of the power supply part 410, and the switch is an inductive switch.

Specifically, in this embodiment, the water lamp body 100 is a hollow three-dimensional modeling, the interior of which can be filled with liquid, and the housing 200 is also a three-dimensional modeling, and the three-dimensional modeling of the water lamp body 100 and the housing 200 can be designed and produced according to the actual production requirements, such as: the water lamp body 100 is in the shape of a rectangular body, and the housing 200 is in the shape of a house; and the housing 200 is placed on the outside of the water lamp body 100, or housing 200 on the water lamp body 100 for the cover, and in the housing 200 on the opening of the wisp hollow part 210, the wisp hollow part 210 is set up light-transmitting sheet 300, at the same time, set up two groups of light-emitting members 420 in the housing 200 and, by one group of light-emitting members 420 light source on the light-transmitting sheet 300 to irradiate the light-transmitting sheet 300, so that the light-transmitting sheet 300 can emit light, and by another group of light-emitting members 420 on the water lamp body 100 to irradiate, so that the water lamp body 100 can also emit light, so that the light and shadow water lamp structure can emit multiple light, combined with the three-dimensional modeling of the housing 200, so that the light and shadow water lamp structure is more with the external modeling and interesting effect, so as to satisfy the consumer’s visual sensibility, and to ensure that the light and shadow water lamp structure is favored by the consumer.

At the same time, in order to control the light effect of the light and shadow water lamp structure, the electronic control unit 400 contains a switch (not shown in the figure) and a circuit board 430, wherein the switch can be used to turn on and off the power of the power supply part 410, the power supply part 410 can be a built-in rechargeable battery, or an ordinary battery that can be replaced, and the circuit board 430 can be used to control the two groups of light-emitting members 420 at the same time to start and stop or to start and stop the light-emitting members 420 in sections. For example, by controlling the switch, one of the light-emitting members 420 and the other light-emitting member 420 light up at the same time, so that the light source of one of the light-emitting members 420 irradiates the light-transmitting sheet 300, and the light source of the other light-emitting member 420 irradiates the main body of the water lamp body 100; moreover, the switch can be controlled so that the two groups of light-emitting members 420 light up or extinguish alternately, and then control the switch so that the two groups of light-emitting members 420 are extinguished, thus forming an alternating segmented start-stop. In this way, the alternating segmented start-stop is formed, so that the light and shadow water lamp structure is more intelligent, and to improve the fun of the light and shadow water lamp structure.

In order to better control the switch, the switch in this embodiment is an inductive switch, which may adopt any one of a light-sensitive switch, an acoustic switch, a human-sensitive switch, or a microwave switch, and the light effect of the two sets of light-emitting members 420 may be effectively controlled by induction, thereby improving the fun of the light and shadow water lamp structure.

Of course, in this embodiment, there may be no restriction on the switch, and the switch may also be a key switch, a toggle switch . . . and when such a switch is used, the switch may be set at the bottom of the housing 200, so that the switch can be hidden, thereby ensuring that the water lamp structure has a beautiful appearance.

In addition, in order to improve the user’s visual sensibility, decorations can also be set inside the water lamp body 100 (not shown in the figure), the decorations are set for the prior art, so it is not repeated here, through the decorations can improve the fun function, thereby improving the user’s visual sensibility.

Among them, the light-transmitting sheet 300 can be a painted plastic sheet or a three-dimensional modeling PVC sheet, through the light source of the light-emitting member 420 to irradiate the light-transmitting sheet 300, can make the painted plastic sheet or the three-dimensional modeling of the PVC sheet more clear and obvious, so as to ensure that to attract the consumer’s vision, so that the light and shadow water lamp structure is more favored by the consumer.

Figure 4:
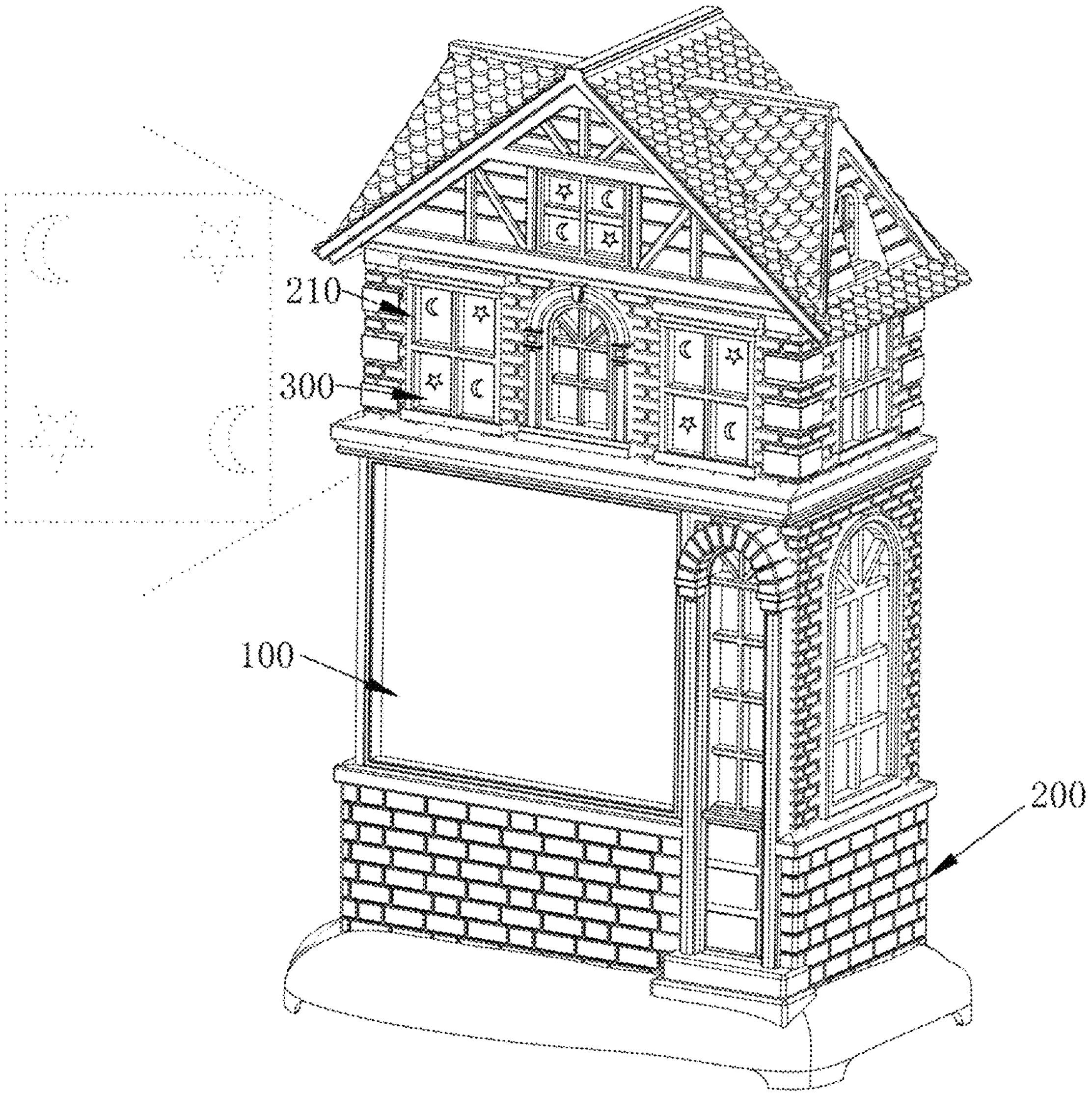
FIG. 4 is a schematic diagram of the projection of the light transmittance sheet of the new light shadow water lamp structure.

Referring to FIG. 4, in another embodiment, the light-transmitting sheet 300 may also be a slide, and when the light source of one of the groups of light-emitting members 420 is irradiated on the light-transmitting sheet 300, the pattern may be projected to the outside through the slide, such as a wall, a ceiling, a curtain, a piece of furniture, and so on, which also improves the interest of the light-shadowed aquatic lamp structure and improves the visual perception of the consumer, and the slide may be changed to a different color or shape of PVC sheet according to the user’s preference, so as to ensure the attraction of consumers’ vision, so that the light-shadowed water lamp structure is more favored by consumers. The slide can be replaced with different patterns according to the user's preference, so that the atmosphere of the environment changes with different visual feelings.

Referring to FIG. 2, in order to fill the water lamp body 100 of the water lamp with liquid and place decorations, the water lamp body 100 of the water lamp in this embodiment includes an outer shell 110 and a water lamp cover 120, the water lamp cover 120 is hermetically sealed and closed in the middle of the bottom of the outer shell 110 so as to form a hermetically sealed space, and the liquid fills up in the hermetically sealed space, and the hermetically sealed and closed connection between the outer shell 110 and the water lamp cover 120 avoids liquid outflow in the hermetically sealed space and facilitates the installation of decorations and the like. The liquid in the confined space can be prevented from flowing out, and it is convenient to install decorations and the like.

At the same time, a pattern may be spray-painted on the side wall of the outer shell 110, and the light source of one of the groups of light-emitting members 420 irradiates the water lamp body 100, and the light source irradiates the spray-painted pattern, so that the consumer can intuitively see the pattern, so as to improve the consumer's visual sensibility.

In this embodiment, the liquid in the confined space can be stirred, and then irradiated by the light source of one group of light-emitting members 420, and the light source is refracted through the flowing liquid, so as to make the light and shadow water lamp structure more interesting and light effects. In order to realize the flow of liquid in the confined space, the bottom of the water lamp body 100 is provided with a magnetic shaft 131 of the motor 130, the motor 130 is electrically connected to the power supply part 410, at the same time, there is a magnetic rotating member 140 corresponding to the magnetic shaft 131 in the interior of the water lamp body 100, when the power supply part 410 supplies power to make the motor 130 work, the magnetic shaft 131 of the motor 130 will rotate, and the magnetic rotating member 140 will be magnetically attracted by the magnetic shaft 131 and rotate accordingly, so that the liquid in the confined space will be stirred by the magnetic rotating member 140, thereby improving the efficacy of the light and shadow water lamp structure.

And of course placing glitter (powder) in the liquid, when the liquid is flowing, it will drive the sequins powder) to flow, and then irradiated by the light source of one group of light-emitting members 420, so that the sequins (powder) projected colorful and dazzling light, thus improving the visual sensibility, so that it can be more favored by consumers.

In order to better facilitate the flow of liquid and sequins (powder), the water lamp cover 120 with a downward groove, and the bottom surface of the outer shell 110 to the water lamp cover 120 groove inclined setting, through the outer shell 110 bottom surface of the inclined design, can be in the liquid stops, sequins (powder) can be slowly flowed to the recessed piece of the water lamp cover 120, and can make magnetic rotating member 140 more convenient to stir the liquid and sequins powder).

In addition, in order to make the two groups of light-emitting members 420 irradiate the light-transmitting sheet 300 and the main body of the water lamp body 100, the circuit board 430 and one of the groups of light-emitting members 420 can be set at the bottom of the main body of the water lamp body 100, so that the light-emitting members 420 can irradiate the main body of the water lamp body 100 from the bottom up, and the other group of light-emitting members 420 can be set at the top of the main body of the water lamp body 100 and connected to the circuit board 430 through the wire, realize the irradiation of the light-transmitting sheet 300; more can be two groups of light-emitting members 420 are set on the top of the water lamp body 100, the two groups of light-emitting members 420 using SMD LED, and make the two groups of light-emitting members 420 were attached to the upper and lower sides of the circuit board 430, the circuit board 430 is fixed to the housing 200 by screws, at this time, the light-emitting member 420 located below the circuit board 430 irradiates the water lamp body 100 of the water lamp from above and below, and the light-emitting member 420 located above the circuit board 430 irradiates the light-transmitting sheet 300, and by setting the two groups of light-emitting members 420 on the upper and lower sides of the circuit board 430, it is convenient to lay out the circuit board 430 and the two groups of light-emitting members 420 to optimize the overall structure of the light and shadow water lamp.

However, the above mentioned is only a better example of the invention is not used to limit the characteristics of the utility model, such as the use of the invention related technical means, the creation of the principle of re-creation, is still within the scope of the creation of the invention, therefore, the invention drawings and the statement described in the specification is not used to limit the scope of the implementation of the invention; any skilled in the art, in the spirit of the invention does not deviate from the spirit of the scope of the invention under the changes and modifications made by the same shall be covered by the invention of the scope of patents, in order to be reasonable.

What is claimed is:

1. A light and shadow water lamp structure, comprising:

a water lamp body, which is a hollow three-dimensional shape;

a shell, three-dimensional shape placed on the outside of the main body of the water lamp, and the shell having an opening with a wisp hollow part, and in the wisp hollow part having a light transmissive sheet, the light transmissive sheet being either colorful plastic sheet or a three-dimensional modeling of a PVC sheet; and an electronic control unit, including a power supply part, a light-emitting member, a circuit board, and a switch, wherein the light-emitting members is provided with two sets, electrically connecting to the power supply part, and the two sets of the light-emitting members being set up on the upper and lower sides of the circuit board, wherein one set of the light-emitting members of the light source is for irradiation of the light transmissive sheet, the other set of the light-emitting members of the light source is for irradiation of the main body of the water lamp.

2. The light and shadow water lamp structure of claim 1, wherein the light transmissive sheet is a projecting sheet, the light source of one of the sets of the light-emitting members projecting a pattern to the exterior when irradiated by the light transmitting sheet.

3. The light and shadow water lamp structure of claim 1, wherein the body of the water lamp is provided with a housing and a water lamp cover, the water lamp cover being hermetically sealed and closed to the bottom of the housing to form a hermetically sealed space, and the hermetically sealed space being filled with a flowable liquid.

4. The light and shadow water lamp structure of claim 3, wherein the bottom surface of the housing is set at an angle towards the water lamp cover.

5. The light and shadow water lamp structure of claim 1, further comprising a motor with a magnetic shaft is provided at the bottom of the body of the water lamp, the motor being electrically connected to the power supply part, and a magnetic rotating member provided in the interior of the body of the water lamp corresponding to the magnetic shaft, the magnetic rotating member being magnetically attracted to the magnetic shaft to rotates accordingly.

6. The light and shadow water lamp structure of claim 1, further comprising an ornamentation in the interior of the body of the water lamp.

7. The light and shadow water lamp structure of claim 1, wherein the circuit board controls a simultaneous start and stop or a segmented start and stop of the two sets of the light-emitting members.

8. The light and shadow water lamp structure of claim 1, wherein the switch is used to switch on and off power of the power supply part, and the switch is a sensing switch.

9. The light and shadow water lamp structure of claim 8, wherein the switch is any one of a light-sensitive switch, an acoustic switch, a human-sensitive switch, or a microwave switch.

10. A light and shadow water lamp structure, comprising:

a water lamp body, which is a hollow three-dimensional shape, wherein there is an ornamentation in the interior of the body of the water lamp, the body of the water lamp comprising a housing and a water lamp cover, the water lamp cover being hermetically sealed and closed to the bottom of the housing to form a hermetically sealed space, and the hermetically sealed space being filled with a flowable liquid;

a shell, three-dimensional shape placed on the outside of the main body of the water lamp, and the shell having an opening with a wisp hollow part, and in the wisp hollow part having a light transmissive sheet, the light transmissive sheet being either a colorful plastic sheet or a three-dimensional modeling of a PVC sheet, or a projecting sheet, and projecting a pattern to the exterior through the projecting sheet;

an electronic control unit, including a power supply part, a light-emitting members, a circuit board, and a switch, the light-emitting member is provided with two sets, and being electrically connecting to the power supply part, and the two sets of the light-emitting members being set up on the upper and lower sides of the circuit board, wherein a one set of the light-emitting members of the light source is for irradiation of the light transmissive sheet, the other set of the light-emitting members of the light source is for irradiation of the main body of the water lamp, wherein the circuit board controls a simultaneous start and stop or a segmented start and stop of the two sets of the light-emitting members, and wherein the switch is any one of sensing switches of a light-sensitive switch, an acoustic switch, a human-sensitive switch, a microwave switch, a button switch, or a toggle switch; and a motor with a magnetic shaft being provided at the bottom of the body of the water lamp, the motor being electrically connected to the power supply part, and a magnetic rotating member corresponding to the magnetic shaft provided in the interior of the body of the water lamp, the magnetic rotating member is magnetically attracted by the magnetic shaft to rotates accordingly.

* * * * *